H. L. DUNCAN.
PROCESS OF MAKING CEMENT.
APPLICATION FILED NOV. 13, 1903. RENEWED MAR. 10, 1914.
1,113,606.
Patented Oct. 13, 1914.
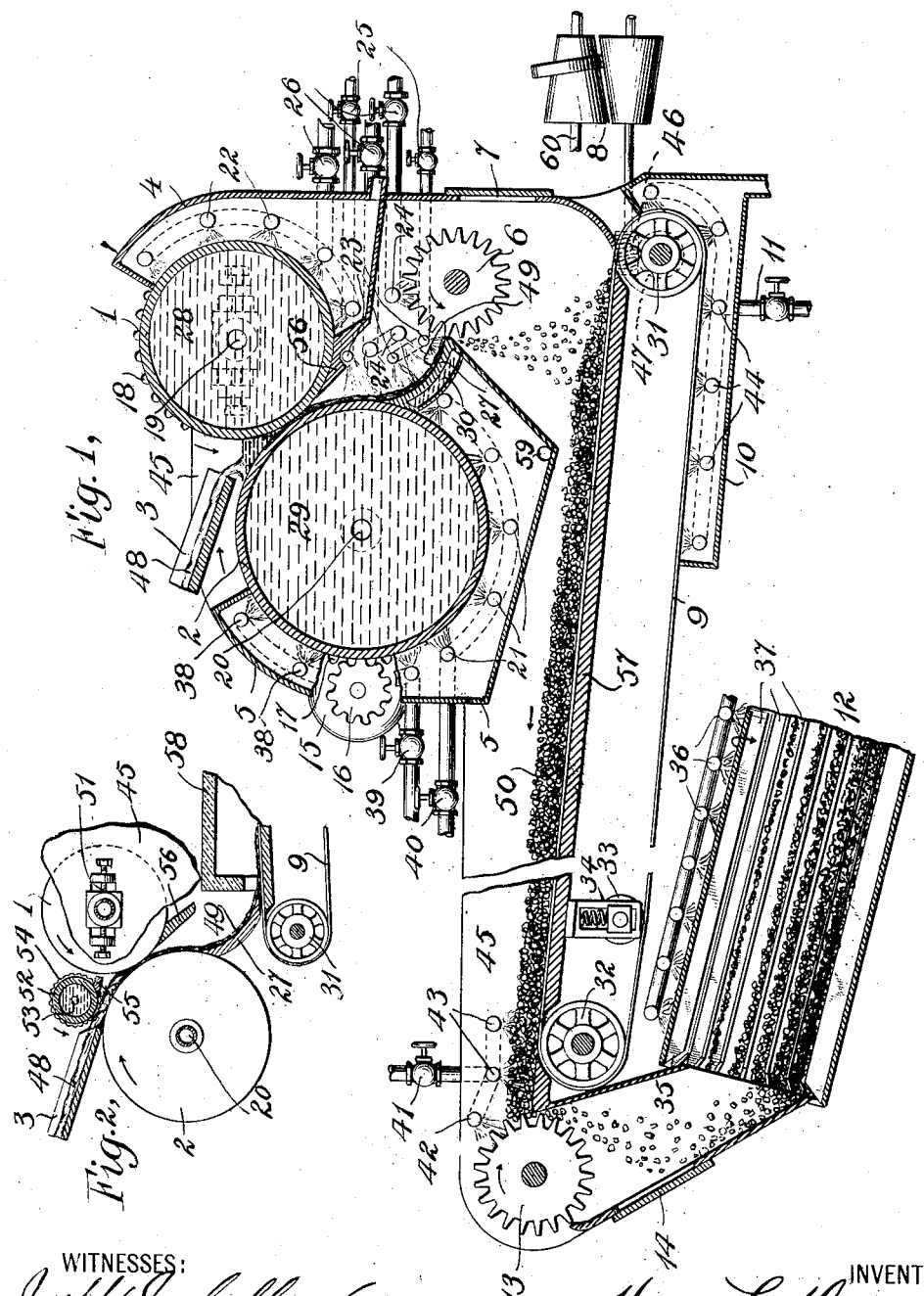

UNITED STATES PATENT OFFICE.

HARRY L. DUNCAN, OF NEW YORK, N. Y.

PROCESS OF MAKING CEMENT.

1,113,606.      Specification of Letters Patent.      Patented Oct. 13, 1914.

Application filed November 13, 1903, Serial No. 180,996. Renewed March 10, 1914. Serial No. 823,797.

*To all whom it may concern:*

Be it known that I, HARRY L. DUNCAN, a citizen of the United States, and resident of New York city, in the borough of Brooklyn, county of Kings, and State of New York, have invented certain new and useful Improvements in Processes of Making Cement, of which the following is a specification, taken in connection with the accompanying drawings, which form a part of the same.

This invention relates to the manufacture of cement from slag and differs from the manufacture of Puzzolanic slag cement in that it is not necessary to add hydrated lime to the slag in this process.

Blast furnace slag which is the waste product from iron furnaces may be used or slag may be specially smelted for use in this process, if desired. The basic blast furnace slag, such as is produced as a by-product in the manufacture of gray pig iron, seems to be best adapted for this process and this high limed slag, preferably contains 45 to 50% of lime and not more than 35% of silica. Basic slag of this description when allowed to cool in large masses in air sometimes decrepitates spontaneously into an impalpable powder.

Basic blast furnace slag may be treated so as to convert the same into material containing considerable proportions of active slag cement material. Usually in the commercial operation this active cement material is not formed in an absolutely pure state, although when water granulated furnace slag is roasted up to a plastic condition which usually corresponds with a temperature of about 1200° centigrade and then quickly cooled a comparatively pure active cement material is formed. This active material does not decrepitate in air and it seems to have a crystalline structure as is evidenced by the fact that it polarizes light. The annealing process to which the slag has been subjected in forming active cement material as herein described and by which the slag is maintained in the annealing or plastic temperature for a considerable length of time seems to effect a rearrangement of the molecular structure of the slag and a formation of compounds different from those occurring in water granulated slag. When active slag cement material is finely ground, slightly moistened, compressed into a cake and subjected to carbon-dioxid, a very considerable rise of temperature takes place, the compressed cake of active material showing a rise of 40° or so centigrade in an atmosphere of pure carbon-dioxid.

Inert slag cement material may also be formed from blast furnace slag and this inert material is found in a comparatively pure condition in water-granulated slag dried at about 200° centigrade. This inert material does not decrepitate in air and seems to have a glassy or non-crystalline structure as indicated by the fact that it does not polarize light. This inert material when finely ground, moistened, compressed into a cake and treated with carbon-dioxid only gives an inconsiderable rise of temperature as compared with that produced with active cement material.

Inert material, such as chilled slag, or such as dried water granulated slag when mixed in a finely powdered condition with about equal parts of active cement material, such as annealed molten furnace slag or roasted water granulated slag produces a valuable highly cementitious material. The setting time of this cementitious mixture may, however, be regulated and its properties improved to some extent by an admixture of about ten per cent. of ordinary Portland cement and also in some cases, if desired, by a further admixture of calcium sulfate to the extent of a few per cent.

In the accompanying drawings in which the same reference numeral refers to similar parts in the several figures, Figure 1 is an elevation partly in section of an apparatus for carrying out this process. Fig. 2 is a partial elevation of a modified construction of apparatus.

A moving congealing surface may be used in this process to congeal substantially molten furnace slag into a consistent stream for treatment. In the drawings, a congealing roll 2 which should have a diameter of three or four feet or so is indicated for this purpose. This roll is preferably provided with a water space 29 so that the congealing surface is kept at the proper temperature by a circulation of water or other fluid, each of the trunnions being formed with an aperture 20 to secure this circulation. This roll which may be used with a coöperating congealing surface of any description is indicated as being formed with the gear 17 in engagement with the pinion 16 secured to an electric motor 15 or other adjustable speed driving device by which the speed of rotation of the congealing roll may be varied to suit the requirements of the process.

The coöperating congealing roll 1 is indicated as being formed with a similar water space 28, each of the trunnions of this roll being formed with a suitable aperture 19 to secure the circulation of the proper cooling fluid. This roll is preferably provided with the gear 18 which may mesh with the gear 17 on the roll 2 so as to rotate these coöperating rolls in unison or the roll 1 may be positively rotated in any other desired way. The roll 1 is adjustable with respect to the other congealing roll so as to vary the distance between them, the trunnion block of the roll 1 being mounted in a slot and adjusted by heavy screws 51, as indicated in Fig. 2. Besides the internal cooling means described, additional external cooling means may be employed, if desired. The cooling chamber 4 may be formed partially inclosing the roll 1, the upper end of the chamber being preferably closely adjacent the roll in the form of a scraper to remove surplus cooling fluid. A number of spray pipes 22 are indicated within the chamber to furnish sprays of cooling fluid, such as water, to the roll, so that the heat of the roll is rapidly dissipated and removed from the exterior portions of the congealing surface. The chilling surface is thereby more quickly cooled than if all the heat were conducted inward to be absorbed by the internal water jacket. The amount of cooling fluids supplied through the spray pipes 22 is regulated by a suitable valve 26 in the supply pipe. A similar cooling chamber 5 is formed around the coöperating roll 2 and a number of spray pipes 38 are shown coöperating with the upper part of the roll within the chamber furnished with the desired amount of cooling fluid by the valve 39 in the supply pipe. Another series of spray pipes 21 coöperate with the lower portion of this roll and the amount of fluid which they furnish is regulated by the valve 40 in the supply pipe with which they are connected. The surplus cooling fluid is removed from the chamber through the aperture 59 at the bottom.

The scraper 56 is mounted adjacent the congealing roll 1 and disengages the congealed consistent stream from this roll and this stream 49 moves down the opposite surface of the congealing roll 2 and is disengaged therefrom by the upper scraping edge of the conveyer 27. This conveyer is preferably formed with a suitable jacket 30 within which water, steam or other fluid may be maintained to regulate the temperature of this conveyer. The consistent slag stream 49 may move directly from the stationary conveyer upon a suitable moving conveyer 9 as indicated in Fig. 2 and this moving conveyer which may be in the form of a belt 9 of metal or other suitable material, is of any desired length and should be long enough so that with the speed used the desired annealing action takes place. This conveyer may, if desired, be inclosed in a suitable annealing chamber 58 indicated in Fig. 2 and suitable heating means may be used, if desired, to maintain the slag on the conveyer in the plastic annealing condition, preferably for a couple of minutes or so. If desired, however, a suitable breaker may be used to break up the consistent stream 49 and this breaker 6 may take the form of a rapidly rotating toothed wheel indicated in Fig. 1 where it is shown mounted to rotate adjacent the end of the conveyer 27. The pieces of slag are thus piled up on the moving conveyer 9 below, which is shown as passing over the guide 57 and mounted upon the drums 31, 32 spaced apart at a suitable distance. A spring-pressed tightening roll 33 be used in connection with this conveyer, this roll being shown as mounted in the slotted frame 34. The drum 31 is rotated at the speed desired by any means and may be rotated by a suitable worm wheel 47 secured to the drum and engaged by the coöperating worm 46. This worm may be driven through the cone pulleys 8 from the driving shaft 60 and the rate of movement of the conveyer 9 may be thus regulated so that the material 50 on the conveyer is kept in the annealing condition for the time desired, preferably a couple of minutes or so. A suitable cooling chamber may be used adjacent the lower end of the conveyer 9, a number of spray pipes 44 being mounted in this chamber and supplied with the desired amount of cooling fluid by the valved supply pipe 11, the surplus water draining out of the chamber as indicated.

A number of treating jets may be mounted adjacent the conveyer to operate upon the slag material thereon. The jet pipes 23 extending parallel to the congealing rolls and which may be provided with a number of apertures along their length for the discharge of fluid are mounted adjacent the conveyer 27 so as to supply jets of treating fluid, such as steam, air, gas or water to the slag. The fluid supplied to the upper jet pipe is controlled by the valve 25 and the fluid supplied to the two lower jet pipes 23 is controlled by a similar separate valve, as indicated. Other jet pipes 24 are indicated by which other treating fluid, such as water, steam, air or gas may be supplied, the amount of fluid issuing from the apertures in these jet pipes being controlled by the valve 26. Also, if desired, a similar perforated jet pipe 24 may be mounted adjacent the breaker 6 and may be furnished with fluid, preferably water or steam, the amount of which is controlled by the valve 26. This fluid assists in rendering the breaker self-clearing, the high speed of the breaker and the treating fluid sprayed upon it preventing the slag from sticking to it to an undesirable extent. Other jet pipes 42, 43 are indicated adjacent the conveyer and the amount of treating fluid supplied to these perforated pipes is regulated by the valve 41. It is, of course, understood that other jet pipes may be used at other portions of the conveyer, if desired.

A suitable pulverizer is mounted adjacent the conveyer and the pulverizer may take the form of the heavy toothed wheel 13 rotated by suitable means adjacent the end of the conveyer. This wheel pulverizes the material which falls down a suitable chute 35 to be cooled and removed. The rotary cooler 12 may be mounted to receive these particles of slag, the cooler being preferably rotated by any desired means and formed with the internally projecting ribs 37 to agitate the material and to rapidly cool the same in connection with the spray pipes 36 which furnish sprays of cooling fluid to the outside of the cooler.

If desired, a suitable feed roll may be employed to positively feed the proper quantity of material to the congealing rolls. In Fig. 2 the feed roll 52 is indicated as being provided with a water space, each of the trunnions being formed with a suitable aperture 53 by which cooling fluid may be supplied to the interior of the roll. The outside of this feed roll is preferably formed with suitable corrugations 54 and also with annular grooves with which a suitable scraper 55 coacts to disengage the material from the roll. This feed roll may be rotated in the direction indicated by any desired means and its trunnions are preferably adjustable with respect to the congealing roll 2 with which it coöperates. The substantially molten slag 48 is supplied to the feeding roll by a number of spouts, each spout 3 being located as shown in the drawing. It is not necessary, however, in all cases to employ the separate feeding roll described, since the positive feeding forward of the material may be effected by slightly roughening the surfaces of the congealing rolls themselves, if desired. The substantially molten slag may be supplied to the bite of the congealing rolls by a number of slag spouts, such as 3, which, as indicated in Fig. 1, supplies a stream 48 of slag. The frame 45 of this apparatus coöperates with the congealing rolls and constitutes the sides of a slag trough which directs the substantially molten slag between the congealing rolls. This frame is continued around the conveyer and may be provided with suitable doors, such as 7 and 14 for inspection or for the circulation of air or treating fluids through the apparatus.

Slag material containing considerable proportions of active cement material may be produced on the apparatus described. The congealing rolls are preferably adjusted so that the consistent stream of slag material is plastic when it issues from the bite of the rolls and preferably about a quarter of an inch thick. This stream, which may be treated with fluid on the conveyer, preferably with air or steam, should be in the plastic condition while it is upon the moving conveyer and if the breaker is used the speed of the various parts of the apparatus should be so adjusted that the slag is piled up on the moving conveyer so that the dissipation of heat is prevented and the slag annealed by its own heat. This amount of slag 50 is thus annealed on the conveyer and the conveyer should be of such length and driven at such speed that the annealing action lasts for several minutes to secure the best results. If desired, however, a suitable substantially inclosed annealing chamber may be formed above the conveyer and this chamber may be supplied, if desired, with heated gases to insure the proper annealing of the slag. This annealing process should not continue so long however, that decrepitation of the slag is effected and after annealing sufficiently the slag should be quickly cooled for this same reason. If an annealing chamber is employed in connection with the conveyer the temperature of the chamber should be so adjusted that the slag is properly annealed by being kept substantially in the plastic condition.

Inert slag cement material may be made on this same apparatus, the congealing rolls for this purpose being preferably adjusted considerably closer together and if desired, also they may be rotated somewhat faster. In this way, the stream of slag may be congealed more thoroughly and may be chilled to a substantially rigid condition when issuing from the congealing rolls. In passing over the conveyer, this slag may be treated with suitable fluid and, indeed, jets of cooling liquid, such as water, may be freely used, since after the slag has been cooled to a certain extent the contact of water does not have a bad effect, the water not being absorbed as is the case when the molten slag is run directly into water. In producing inert cement material therefore, the congealing rolls may be set as close together as a 16th or an eighth of an inch, the resulting stream of consistent material being treated first by steam or air if desired, and then by water jets to rapidly chill and cool the same, the material being subsequently broken up for more convenient further treatment.

The materials thus produced are finely pulverized and mixed together in such proportions that the mixture contains about equal parts of active cement material and inert cement material, although considerable variations may be made from these proportions. An admixture of about ten per cent. of Portland cement may be made to the mixed slag product and a further admixture of one or two per cent. of calcium sulfate may be used to improve the setting properties of the cementitious material formed. If the material produced by this process which contains the active cement material is not entirely pure, a suitable allowance may be made for this fact in mixing the two kinds of treated slag. Indeed, in some instances, the apparatus may be so operated that parts of the slag are rapidly chilled to form inert cement material and other portions are suitably annealed to form a material containing considerable portions of active material. In this way, the resulting slag product may contain without further admixture the proper proportions of active and inert cement materials.

It is, of course, understood that those familiar with this art may make many changes in the number, character and order of the steps of this process which have been described. This process may also be carried out without using the particular apparatus which has been described herein, and furthermore, it is understood that it is not necessary to employ the particular kind of slag which has been mentioned, since slag of different composition may be employed in some cases and indeed, slags containing considerable less lime may sometimes be used. I do not, therefore, desire to be limited to the details of the disclosure which has been made in this case, but

What I claim as new and what I desire to secure by Letters Patent is set forth in the annexed claims.

1. The cement process, that consists in congealing substantially molten furnace slag by contact with a congealing surface into a sheet of plastic material, in breaking up and annealing said material and in subsequently pulverizing and cooling the same to form slag material containing substantial proportions of active cement material; in treating furnace slag to produce inert cement material; and in mixing substantial proportions of said active cement material, said inert cement material, and Portland cement.

2. The cement process, that consists in congealing substantially molten furnace slag by contact with a congealing roll into a sheet of plastic material, breaking up said material and in piling the same upon a conveyer to anneal the same, and in subsequently pulverizing and cooling the same so as to form slag material containing substantial proportions of active cement material.

3. The cement process, that consists in congealing substantially molten furnace slag into a stream of plastic material, in breaking up and piling said material upon a conveyer, and in pulverizing and cooling said material to form slag material containing substantial proportions of active cement material.

4. The cement process, that consists in congealing substantially molten furnace slag into a stream of consistent material, in breaking up and piling said material upon a conveyer, and in subsequently cooling the same to form slag material containing substantial proportions of active cement material.

5. The cement process, that consists in congealing substantially molten furnace slag into a stream of plastic material, in annealing said material and in subsequently pulverizing and cooling the same to form slag material containing substantial proportions of active cement material.

6. The cement process, that consists in congealing substantially molten furnace slag into a stream of consistent material, in treating said material with jets of impinging cooling fluid, in annealing said material while in a plastic condition and in subsequently cooling the same to form slag material containing substantial proportions of active cement material.

7. The cement process, that consists in forming a stream of consistent furnace slag material, in treating said material with jets of impinging cooling fluid, in annealing said material while in a plastic condition, and in subsequently cooling the same to form slag material containing substantial proportions of active cement material.

8. The cement process, that consists in forming a stream of consistent furnace slag material, in annealing said material, and in subsequently cooling the same to form slag material containing substantial proportions of active cement material.

9. The cement process, that consists in forming a stream of consistent furnace slag material, and in annealing said material to form slag material containing substantial proportions of active cement material.

10. The cement process, that consists in forming a stream of consistent furnace slag material, in breaking up and piling said material upon a conveyer, and in subsequently cooling the same to form slag material containing substantial proportions of active cement material.

11. The cement process, that consists in congealing substantially molten furnace slag by congealing rolls into the stream of consistent material, in treating said material with fluid jets and in pulverizing the same to form slag material containing substantial proportions of inert cement material.

12. The cement process that consists in forming a stream of consistent furnace slag material having a substantially uniform thickness and in treating the same with impinging fluid jets.

13. The cement process that consists in forming a stream of consistent furnace slag material of uniform cross-section, in treating the same with fluid jets and in pulverizing the same.

14. The cement process that consists in forming without contact with water a stream of consistent furnace slag material, in subsequently treating the same with fluid jets and in pulverizing the same.

15. The cement process that consists in forming without contact with moisture a stream of consistent furnace slag material and in subsequently treating the same with impinging fluid jets.

16. The cement process that consists in congealing substantially molten furnace slag into a stream of plastic material, in breaking up said material, in piling said material together for a definite time to anneal the same, and in subsequently pulverizing and cooling said material to form slag material containing substantial proportions of active cement material.

17. The cement process that consists in congealing substantially molten furnace slag into a stream of plastic material, in annealing said material for a definite time and in subsequently pulverizing and cooling the same to form slag material containing substantial proportions of active cement material.

18. The cement process that consists in forming a stream of consistent furnace slag material and in annealing said material for a definite time to form slag material containing substantial proportions of active cement material.

19. The cement process that consists in forming plastic furnace slag material, in annealing said material for a definite time and in subsequently cooling the same to form slag material containing substantial proportions of active cement material.

20. The cement process that consists in forming substantially plastic furnace slag material and in annealing said material for a definite time to form slag material containing substantial proportions of active cement material.

21. The cement process that consists in forming substantially out of contact with water a stream of consistent furnace slag material, in subsequently treating the same with fluid jets and in pulverizing and in cooling the same.

22. The cement process that consists in forming substantially out of contact with water a stream of consistent furnace slag material, in treating the same with impinging jets and in cooling the same.

23. The cement process that consists in congealing substantially molten furnace slag out of substantial contact with water in treating the same with impinging cooling jets and in cooling the same.

24. The cement process that consists in breaking up and piling congealed heated furnace slag upon a conveyer to form thereon a pile of granular slag material of substantially uniform cross section, in treating said slag material with cooling fluid jets and pulverizing and cooling the same to form slag material containing substantial proportions of active cement material.

25. The cement process that consists in disintegrating and piling on a conveyer consistent heated furance slag to form thereon a pile of granular material in annealing said slag material for a definite time and in subsequently pulverizing and cooling the same to form slag material containing substantial proportions of active cement material.

26. The cement process that consists in forming without substantial contact with water a pile of granular consistent heated furnace slag material, in annealing said material for a definite time and in subsequently pulverizing and cooling the same to form slag material containing substantial proportions of active cement material.

27. The cement process that consists in forming a pile of consistent granular furnace slag material having a substantially uniform thickness, in feeding said pile forward as it is formed, in treating the same with fluid jets and in pulverizing and cooling said slag material.

28. The cement process that consists in forming a pile of consistent granular furnace slag material having a substantially uniform thickness and in treating the same with impinging fluid jets.

HARRY L. DUNCAN.

Witnesses:
JOSEPH J. COLLINS,
JESSIE B. KAY.